Sept. 3, 1940.                R. S. DONAHEY                 2,213,187
                              CERAMIC VAULT
                        Filed March 31, 1937          2 Sheets-Sheet 1

INVENTOR.
Richard S. Donahey
BY Ray, Oberlin & Ray
ATTORNEYS.

Sept. 3, 1940.  R. S. DONAHEY  2,213,187
CERAMIC VAULT
Filed March 31, 1937  2 Sheets-Sheet 2

INVENTOR.
Richard S. Donahey
BY
Ray, Oberlin & Ray
ATTORNEYS.

Patented Sept. 3, 1940

2,213,187

UNITED STATES PATENT OFFICE 2,213,187

CERAMIC VAULT

Richard S. Donahey, New Philadelphia, Ohio

Application March 31, 1937, Serial No. 134,106

2 Claims. (Cl. 27—35)

This invention relates to large ceramic articles and method of making the same and is particularly directed towards an improvement in the burial vault disclosed by my Patent No. 2,063,421 and to improvements in the method of manufacturing important components of that vault.

In making ceramic articles of the clay tile variety, whether vitrified or not, the problem of reducing losses in firing is one which increases in difficulty as the size of the article increases. In the larger sizes these losses, due to warping, checking, and cracking, becomes excessive or even prohibitive and have hitherto prevented the commercial production of monolithic baked clay products in the larger size ranges in fields for which they are otherwise very well suited. For example, a clay stopper (also known as a lid, or end) for closing a drain end cannot practically be made of diameter much in excess of 12 inches and even in this size the losses in firing frequently rise as high as 25%, although similar stoppers on the order of 6 inches in diameter may show only a 1% firing loss. The difficulties increase so rapidly as the size of the stopper increases that it is at present not considered practicable to make such a stopper more than 12 inches in diameter. Where a larger size is necessary other materials are generally used.

It is known to make one-piece burial vaults of a single cylindrical vitrified or burned tile on the order of 7 feet long and 3 feet inside diameter, large enough to receive an ordinary casket, all as shown in my Patent 2,063,421. In one aspect my present invention concerns an improved cylindrical part or tube of such a vault. Another aspect relates to the making of ends or stoppers for such vaults of the same material as the tube. The making of such ends has hitherto been difficult and unduly expensive for the reasons mentioned above. However, it is very desirable to use the same material for the stoppers because of its inherent advantages over concrete or metal on the score of everlasting durability, cheapness if manufacturing troubles can be mastered, uniformity of appearance with the trunk of the vault.

This aspect of my invention covers an improved vault, and particularly emphasizes an end or stopper made of fired clay, preferably vitrified, in one piece and of diameters on the order of 24 inches or more, up at least to the full outside vault diameter. My invention relates both to such articles of manufacture and to the process of producing the same.

It is recognized that tiling clay shrinks during the stage of drying preliminary to firing and also during the firing. Such shrinkage must necessarily be allowed for by difference in size between the "green" and the finished product so that the dimensions of the article as completed will be correct and there will be no uneven stresses resulting in cracks or other defects, but mere size allowance is not sufficient, because irregularities of mass distribution and of shape, unless properly compensated, give rise to uneven shrinkage and concentrated localized stresses. To the accomplishment of this result of correct dimensions and freedom from localized stresses I produce my end or stopper with certain characteristics of shape, which may be modified as to detail, whereby the inevitable shrinkage is not productive of injury to the finished product, and I make in my process certain allowances for such shrinkage which, when considered in their relation to the shapes employed, are effective for this purpose.

To the accomplishment of both the foregoing and related purposes, said invention, then, consists of the means hereinafter fully described and particularly pointed out in the claims.

The annexed drawings and the following description set forth in detail one method and one product exemplifying my invention, such disclosed procedure and product constituting, however, but one of various applications of the principles of my invention.

Figure 3:
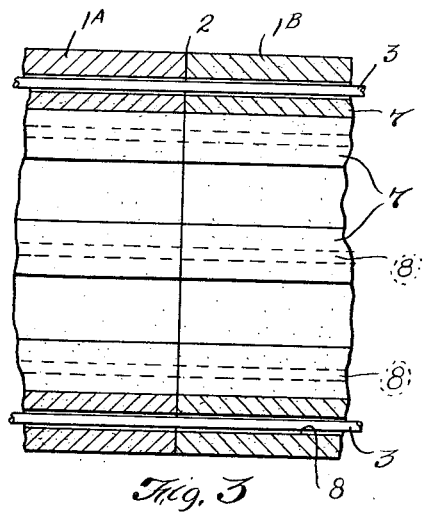
Fig. 3 is a longitudinal section illustrating a joint in a two-piece tube.
Figure 4:
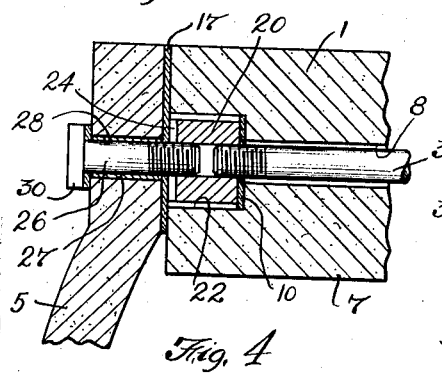
Fig. 4 is a longitudinal section through an improved joint.

My present improved vault comprises a tube 1 and detachable ends 5 applied thereto by suitable fastenings, one of which, particularly adapted for this service, is shown in detail in Fig. 4. Although it is ordinarily contemplated that the tube will be a single piece, circumstances may render its manufacture in longitudinal sections advisable, as is indicated in Fig. 3 illustrating adjacent parts of sections 1A and 1B joined at 2 and fastened by tie rods 3, some of which are omitted to simplify the drawing. The tube is constructed with a plurality of lugs, preferably continuous parallel ribs 7 on the inside wall, and perforated as at 8 for the passage of the tie rods 3. Detachable feet 12 support the tube horizontally, with two of the ribs 7 level to receive, guide and support the casket 15 thereon.

The vault, with the casket therein, is closed by the lids 5, which make a water-tight and air-tight joint at 17 with the tube 1. The joints 17 (and 2 if the tube is sectional) may be ground and preferably will also be made up with any suitable sealing material. By grinding the joint and using a very thin layer of cement (the thickness is exaggerated in Fig. 4) an enduring water-tightness is obtained without rabbets, tongues-and-grooves, or similar arrangements, although such formations may be employed if desired.

A detail of a preferred fastening means is shown in Fig. 4. This consists of an internally threaded nut 20 in a countersink 22 in the end of the tube 1, the countersink being concentric with the rod passage 8. Screwdriver slots 24 permit the nut to be set up on the end of the tie rod 3 and tightly against a washer 10 of lead, soft copper, or other suitable material in the bottom of the countersink 22. A stud 26 passing through a hole 28 which may be lined with a headed close-fitting soft metal sleeve 27 in the rim of the lid 5, also takes into the threads of the nut 20. This stud 26 is best formed with an enlarged head 30.

Figure 1:
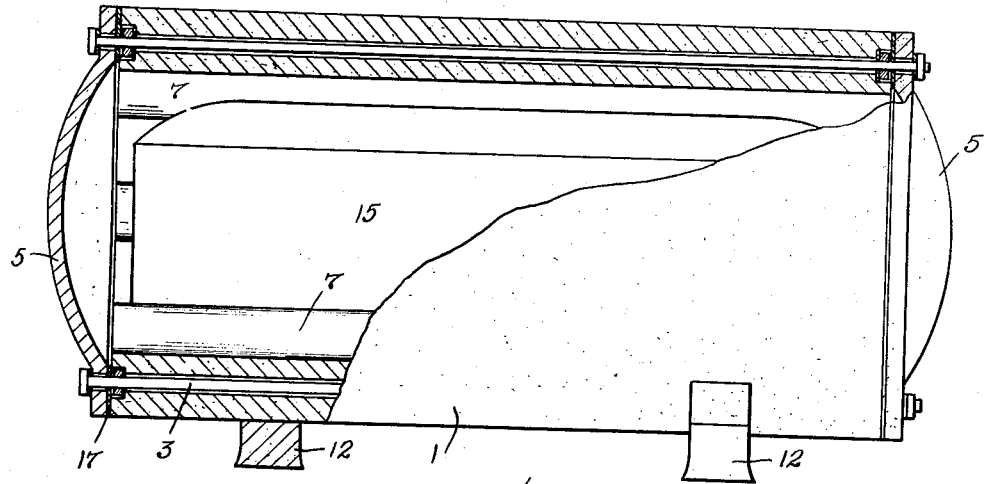
Fig. 1 is a central longitudinal vertical section through my improved vault.
Figure 2:
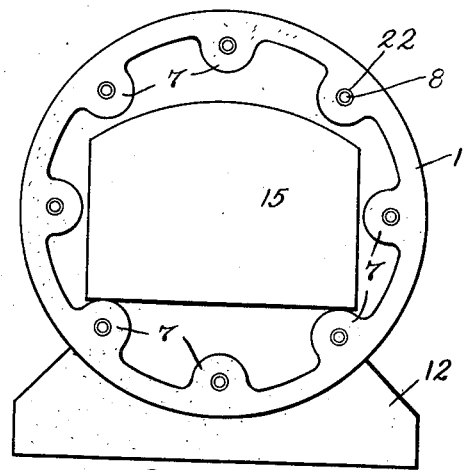
Fig. 2 is a view of either end of the same, without the stopper but showing a casket in place.
Figure 4A:
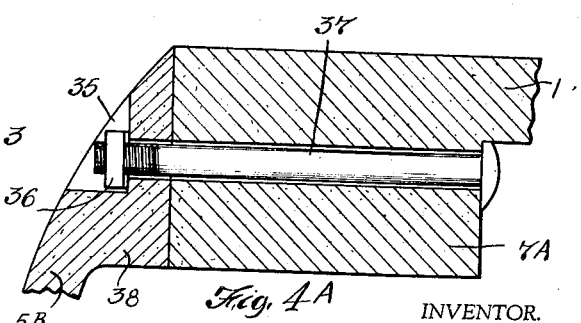
Fig. 4A is a section corresponding to Fig. 4, but showing a modification.

Fig. 4A illustrates modifications of the fastening details and of the lid, which modifications are capable of use in various combinations. The barrel 1C of the vault is the same as in the other forms of construction, and the end view would be no different from that of Fig. 2. The lugs 7A, instead of extending the full length of the vault, extend only a short distance inward. They may be formed inside the vault by any suitable method, but preferably are separately made and "branched" on to the inside of the vault while the clay is still green. The lid 5B is here shown as modified from the lid of Fig. 5 and as having a seat 35 for a nut 36 on the short bolt 37 which passes through registering openings in the lug 7A and in the lid and is headed at its inner end. The form of lid which may be employed is optional so that either lid 5 or lid 5B may be used if the holes register. In order to provide a bearing between the lid and the lug 7A, where the holes are so far inside, the lid 5A, shown in Fig. 10, must be modified by an interior shoulder 38.

As previously stated, the invention, besides the provision of the foregoing improved form of the vault tube and the fastenings, also includes an improved one-piece end closure and method of manufacturing the same, as hereafter explained and as illustrated by Figs. 5 to 11 inclusive.

Figure 5:
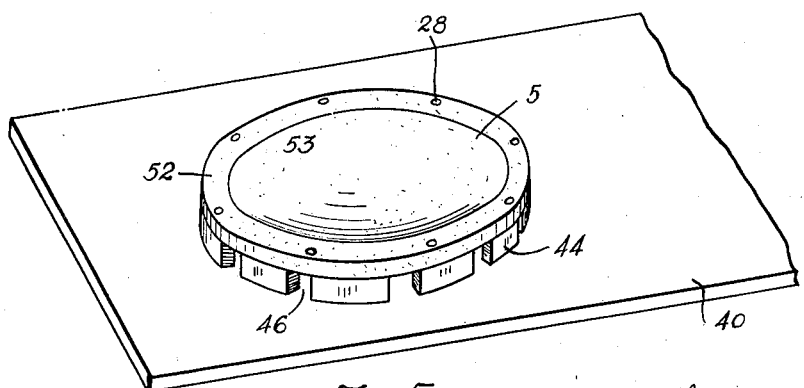
Fig. 5 is a perspective view of an end ready for firing.

Fig. 5 illustrates an end 5 set up on a kiln floor 40 ready for firing. The same method is applicable to modified forms such as 5A or 5B. The end 5, which is outwardly convex, rests by its inner edge on a ring of blocks 44, spaced apart as at 46 to permit access of gases, heat, salt for vitrifying (if the tile is to be vitrified), and the kiln atmosphere generally, to the under side of the end. The end rests only by its weight on these blocks 44, which blocks are laid but not fastened to the kiln floor 40, allowing free movement of expansion and contraction.

Figure 8:
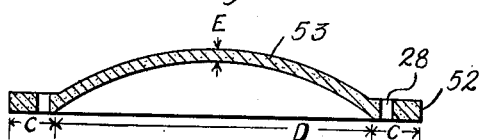
Figs. 8 and 9 are a central section and a plan, respectively, of the end shown in Fig. 5, but with perforations differently spaced.

Fig. 8 illustrates a mid-section through the end 5 taken on any plane through opposite bolt holes 28. The form of tile here illustrated comprises a flat annular rim 52 and a spherical or spheroidal principal surface or dome 53.

Figure 10:
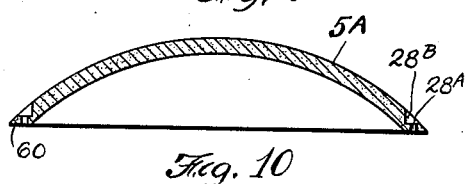
Figs. 10 and 11 are a central section and end view respectively through a modified form of end.
Figure 9:
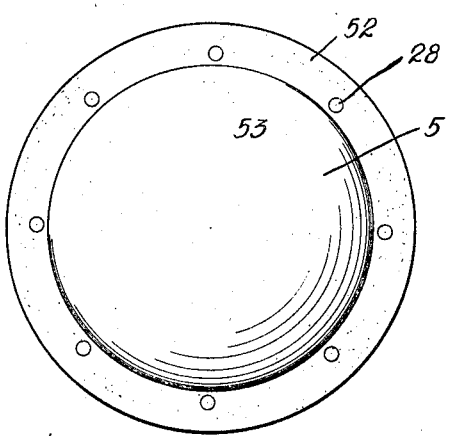
Figure 11:
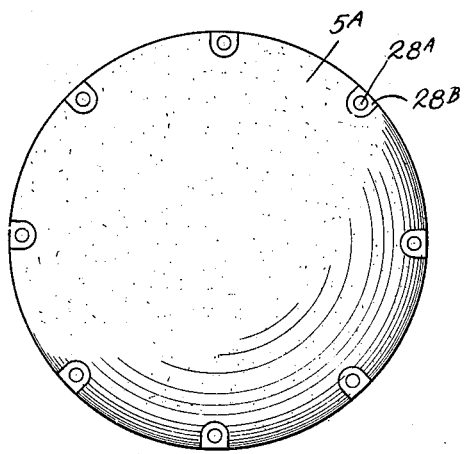

In the modified form 5A shown in Fig. 10 the entire end is convex and rimless, with flat bottom edge 60 and bolt holes 28A countersunk as at 28B. The actual lid shown in Figs. 10 and 11 is provided with bolt holes adapted for registry with the tile shown in my Patent No. 2,063,421 where the tie rods are spaced further out. As already mentioned, where this form of lid is to be used with fastenings spaced further in, it must be modified as indicated at 5B, Fig. 4A.

In forming the end 5, Fig. 8, in "green" clay the oversize which must be allowed for shrinkage depends upon the characteristics of the clay but is on the order of 1 inch to the foot in superficial dimensions. Thus for an end to have finished diameter of 40 inches, assuming a rim width C 2¼ inches, the finished inside diameter D of the dome 53 would be 35½ inches. Allowing for the shrinkage at the rate of approximately 1 inch to the foot, and disregarding the difference in length between arc and chord, the end would be made up in the "green" state with outside diameter, $D+2C=43\frac{1}{3}''$; composed thus:

$$D=35\frac{1}{2}''+2^{23}/_{24}''=38^{11}/_{24}''$$

$C=2^{1}/_{48}''$. In dimensions of thickness a greater allowance is necessary. For example, assuming that the radial thickness of the dome 53, such as the dimension E Fig. 8, is to be 1⅛ inch after firing, the dome would be made in a green thickness of 1¼ inch.

In making the ends 5A or 5B corresponding allowances are made. In all these ends the dome, by changing its contour, makes up for expansion and contraction changes which occur in curing, firing and cooling and thus avoids the large cracking loss which has hitherto made it commercially impossible to produce ends or "stoppers" much above a foot in diameter.

While I have not made exhaustive studies of the underlying scientific principles whereby such a great reduction in curing and firing losses is accomplished, it appears that the internal stresses due to changes of dimension during these steps result in slight alterations in the contour of the dome. As a result stresses which would occasion cracks or breaks in a large flat stopper are taken up by the dome camber and cause no injurious results.

Figure 6:
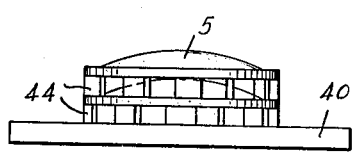
Figs. 6 and 7 are elevations, on a smaller scale than Fig. 5, illustrating other arrangements for firing.

Various modifications of the firing arrangement shown in Fig. 5 are possible. For example, several ends 5 may be successively piled, as illustrated in Fig. 6. Another possibility is that of Fig. 7, in which the tile which is set endwise on spaced blocks 44, another series of blocks 44 is placed on the upper end of the tile, and the end 5A or 5 is placed on top of the upper series of blocks.

Figure 7:
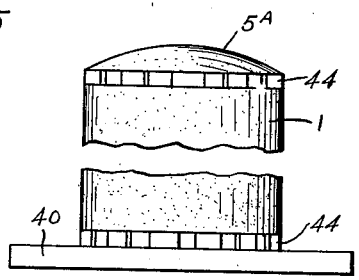

In the arrangements of Figs. 5, 6 and 7, it will be observed that the spacing of the blocks is sufficient to allow circulation to interior surfaces and under surfaces.

The arrangement of Fig. 7 is particularly advantageous as economizing space in firing a number of complete vaults. Obviously, it is advantageous from a manufacturing standpoint to be able to make up requirements of vaults and ends for stock all at the same time and with a single firing. By putting one end on each vault as in Fig. 7, and stacking the remaining ends as in Fig. 6, efficient kiln loading can be accomplished. Another possibility of kiln arrangement is in the situation where vaults are to be made in two pieces (Fig. 3), each piece can be set up for firing with one end on top as in Fig. 7. It is, however, not ordinarily contemplated to make the vaults in more than one piece unless some unusual condition, such as shipping space limitations, require it.

From the foregoing it will be seen that I have improved upon my previous vault by simplifying the construction and reducing the amount of material required. It will also be seen that as regards the manufacture of the large end stopper, I have discovered a method of so greatly reducing firing losses as to open up a new field of possibilities in the ceramic art.

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. A burial vault comprising in combination a vitrified clay tube and vitrified clay end closures, ribs within said tube running lengthwise on the interior walls thereof, burial casket supporting rails within said tube consisting of certain of said ribs oppositely symmetrically disposed, and fastening means between said tube and closures, said fastening means comprising tension elements running through said ribs.

2. A burial vault comprising a vitrified clay body, ribs within said body running lengthwise on the interior walls thereof, certain of said ribs being oppositely symmetrically disposed and spaced apart less than the internal diameter of the body to provide runways to receive and support a casket thereon.

RICHARD S. DONAHEY.